(12) United States Patent
Jangula

(10) Patent No.: US 6,857,619 B1
(45) Date of Patent: Feb. 22, 2005

(54) POST PULLER SYSTEM

(76) Inventor: Frank M. Jangula, 6068 County Rd. 66, Jud, ND (US) 58454

( * ) Notice: Subject to any disclaimer, the term of this patent is extended or adjusted under 35 U.S.C. 154(b) by 0 days.

(21) Appl. No.: 10/719,918

(22) Filed: Nov. 21, 2003

(51) Int. Cl.$^7$ .............................................. B66F 11/00
(52) U.S. Cl. ..................... 254/30; 254/29 R; 254/132
(58) Field of Search ................... 254/30, 29 R, 254/132, 31, 131

(56) References Cited

U.S. PATENT DOCUMENTS

| | | | | |
|---|---|---|---|---|
| 2,482,950 A | | 9/1949 | Toftey | 254/30 |
| 3,848,850 A | | 11/1974 | Bernis | 254/30 |
| 4,226,402 A | | 10/1980 | Muth | 254/30 |
| 4,256,286 A | | 3/1981 | Hudgins | 254/30 |
| 4,706,935 A | | 11/1987 | Thompson | 254/29 |
| 4,750,711 A | | 6/1988 | Landry | 254/30 |
| 4,846,445 A | | 7/1989 | Pfeffer | 254/30 |
| 5,211,374 A | | 5/1993 | Head et al. | 254/30 |
| 5,242,152 A | | 9/1993 | Schatz | 254/30 |
| 5,526,637 A | * | 6/1996 | Leonard | 56/16.4 R |
| 5,794,918 A | | 8/1998 | Price | 254/30 |
| 6,056,271 A | | 5/2000 | Riojas | 254/30 |
| 6,382,594 B1 | | 5/2002 | Ransom | 254/30 |
| 6,641,347 B2 | * | 11/2003 | Ewington | 414/23 |

* cited by examiner

Primary Examiner—Lee D. Wilson

(57) ABSTRACT

A post puller system for efficiently removing posts from a ground surface. The post puller system includes a frame attachable to a loader of a tractor, an extended structure extending from the frame, a first jaw pivotally attached to the extended structure, an actuator unit attached between the frame and the first jaw, and a second jaw and a third jaw attached to the extended portion. A post is positioned between the jaws and the actuator unit closes the first jaw with respect to the second jaw and the third jaw until catchably engaged. The user then lifts the post from the ground surface.

20 Claims, 7 Drawing Sheets

POST PULLER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to post pullers and more specifically it relates to a post puller system for efficiently removing posts from a ground surface.

2. Description of the Related Art

Post pullers have been in use for years. Conventional post pullers are typically comprised of a hand-operated structure wherein the user must manually attach and remove the post from the ground surface. Another method utilized by farmers to remove posts is by utilizing a chain or rope attached between a loader and the post. Both of these post removing systems have their inherent problems.

While these devices may be suitable for the particular purpose to which they address, they are not as suitable for efficiently removing posts from a ground surface. Conventional post pullers are manually operated and are time consuming to operate.

In these respects, the post puller system according to the present invention substantially departs from the conventional concepts and designs of the prior art, and in so doing provides an apparatus primarily developed for the purpose of efficiently removing posts from a ground surface.

BRIEF SUMMARY OF THE INVENTION

In view of the foregoing disadvantages inherent in the known types of post pullers now present in the prior art, the present invention provides a new post puller system construction wherein the same can be utilized for efficiently removing posts from a ground surface.

The general purpose of the present invention, which will be described subsequently in greater detail, is to provide a new post puller system that has many of the advantages of the post pullers mentioned heretofore and many novel features that result in a new post puller system which is not anticipated, rendered obvious, suggested, or even implied by any of the prior art post pullers, either alone or in any combination thereof.

To attain this, the present invention generally comprises a frame attachable to a loader of a tractor, an extended structure extending from the frame, a first jaw pivotally attached to the extended structure, an actuator unit attached between the frame and the first jaw, and a second jaw and a third jaw attached to the extended portion. A post is positioned between the jaws and the actuator unit closes the first jaw with respect to the second jaw and the third jaw until catchably engaged. The user then lifts the post from the ground surface.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a post puller system that will overcome the shortcomings of the prior art devices.

A second object is to provide a post puller system for efficiently removing posts from a ground surface.

Another object is to provide a post puller system that may be utilized upon various types of posts such as but not limited to wood posts and metal posts.

An additional object is to provide a post puller system that is attachable to various vehicles such as but not limited to tractors.

A further object is to provide a post puller system that does not require significant physical labor to remove a post from a ground surface.

Another object is to provide a post puller system that efficiently removes posts from a ground surface.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
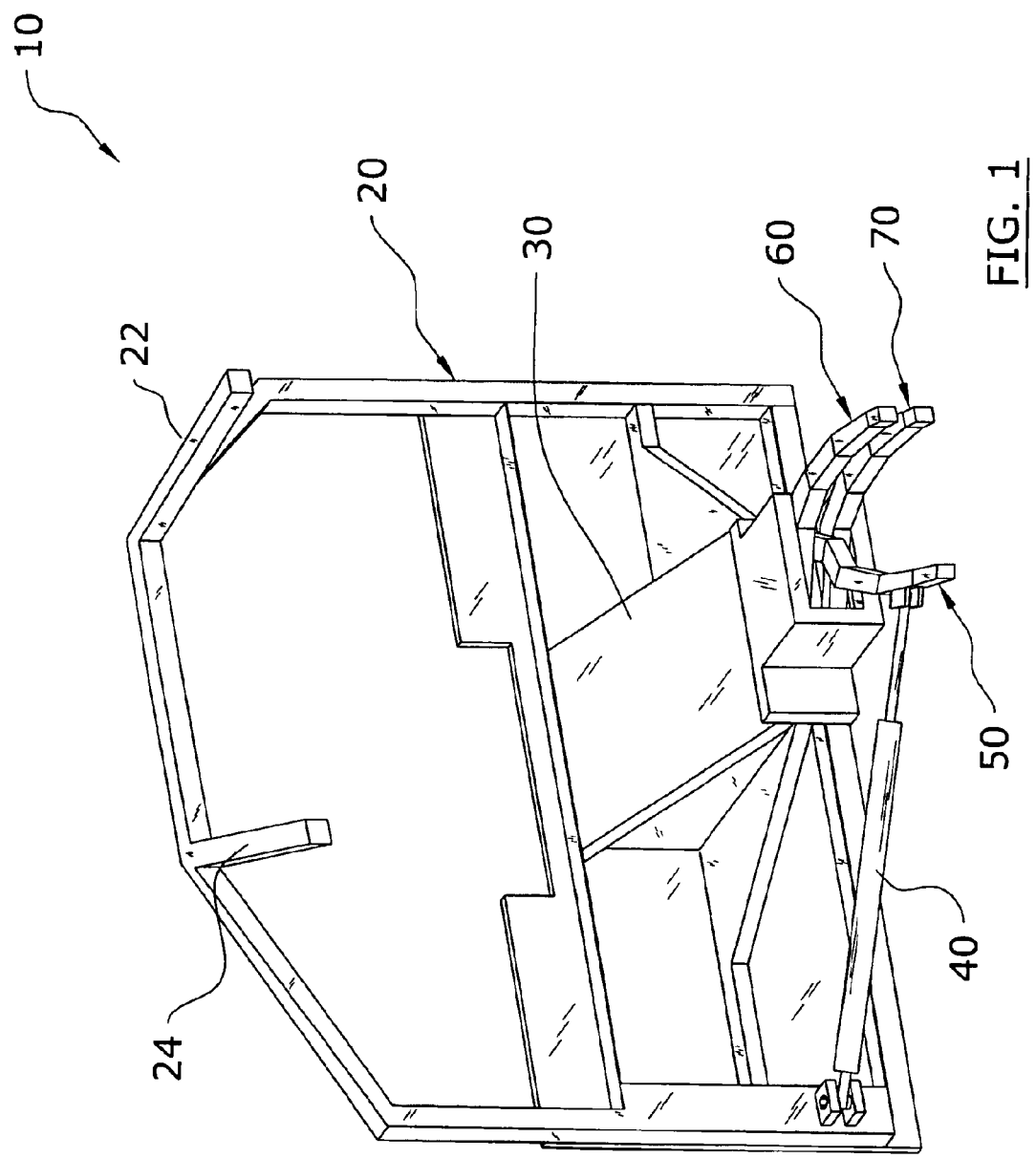
FIG. 1 is an upper perspective view of the present invention with the jaws open.

Turning now descriptively to the drawings, in which similar reference characters denote similar elements throughout the several views, FIGS. 1 through 7 illustrate a post puller system 10, which comprises a frame 20 attachable to a loader of a tractor 12, an extended structure 30 extending from the frame 20, a first jaw 50 pivotally attached to the extended structure 30, an actuator unit 40 attached between the frame 20 and the first jaw 50, and a second jaw 60 and a third jaw 70 attached to the extended portion. A post is positioned between the jaws and the actuator unit 40 closes the first jaw 50 with respect to the second jaw 60 and the third jaw 70 until catchably engaged. The user then lifts the post from the ground surface.

B. Frame

Figure 2:
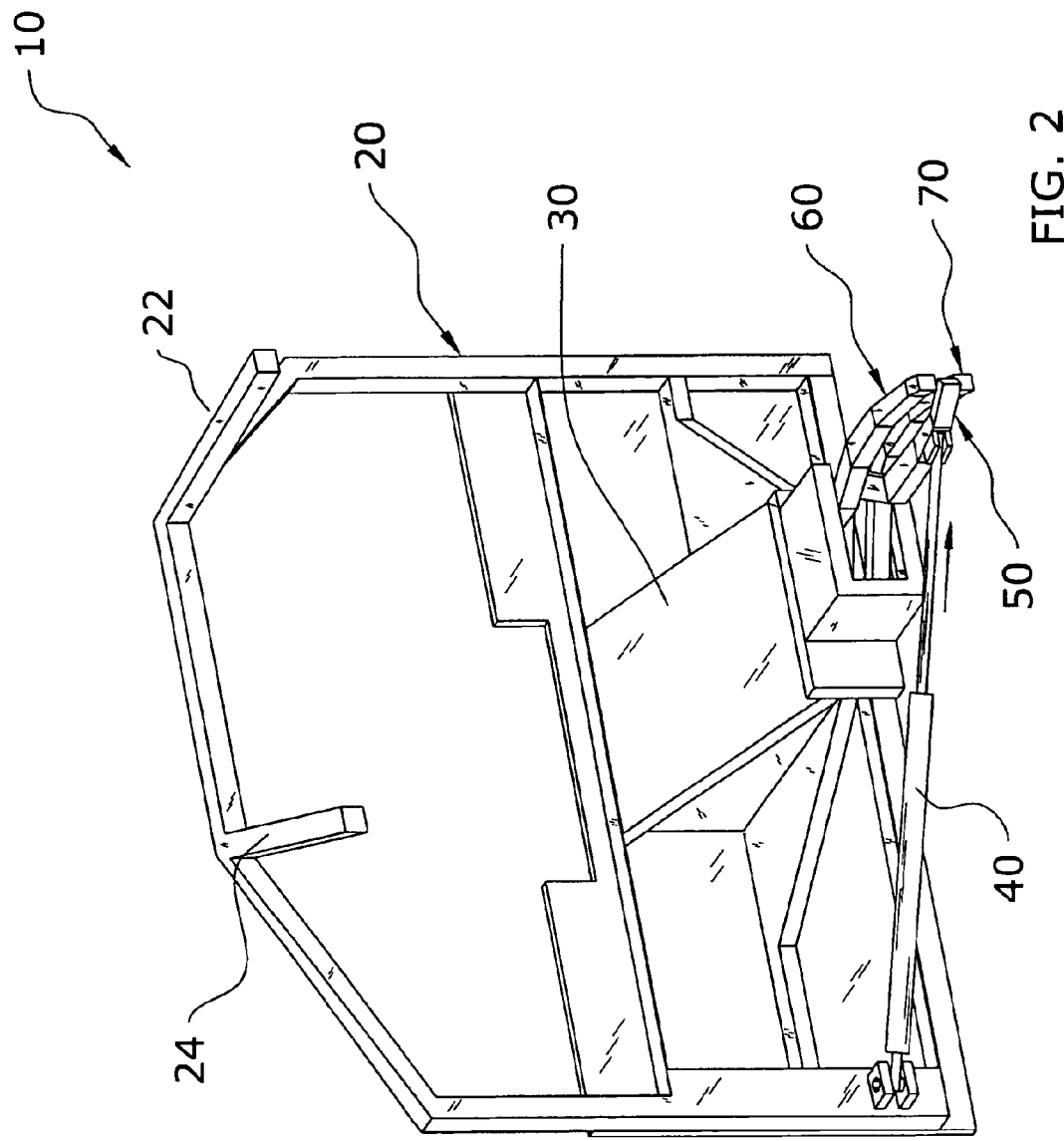
FIG. 2 is an upper perspective view of the present invention with the jaws closed.
Figure 5:
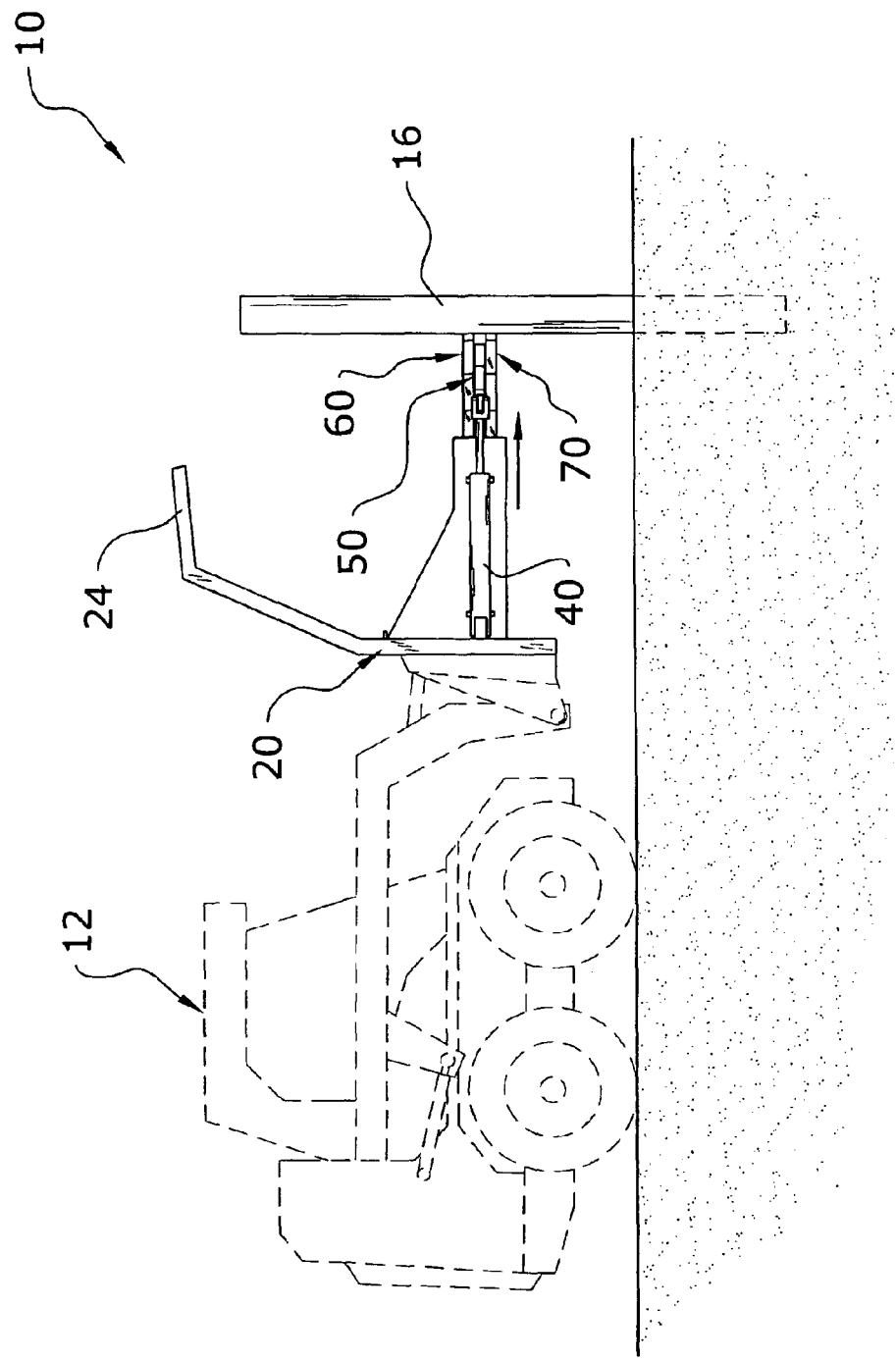
FIG. 5 is a side view of the present invention being positioned about a wooden post.
Figure 6:
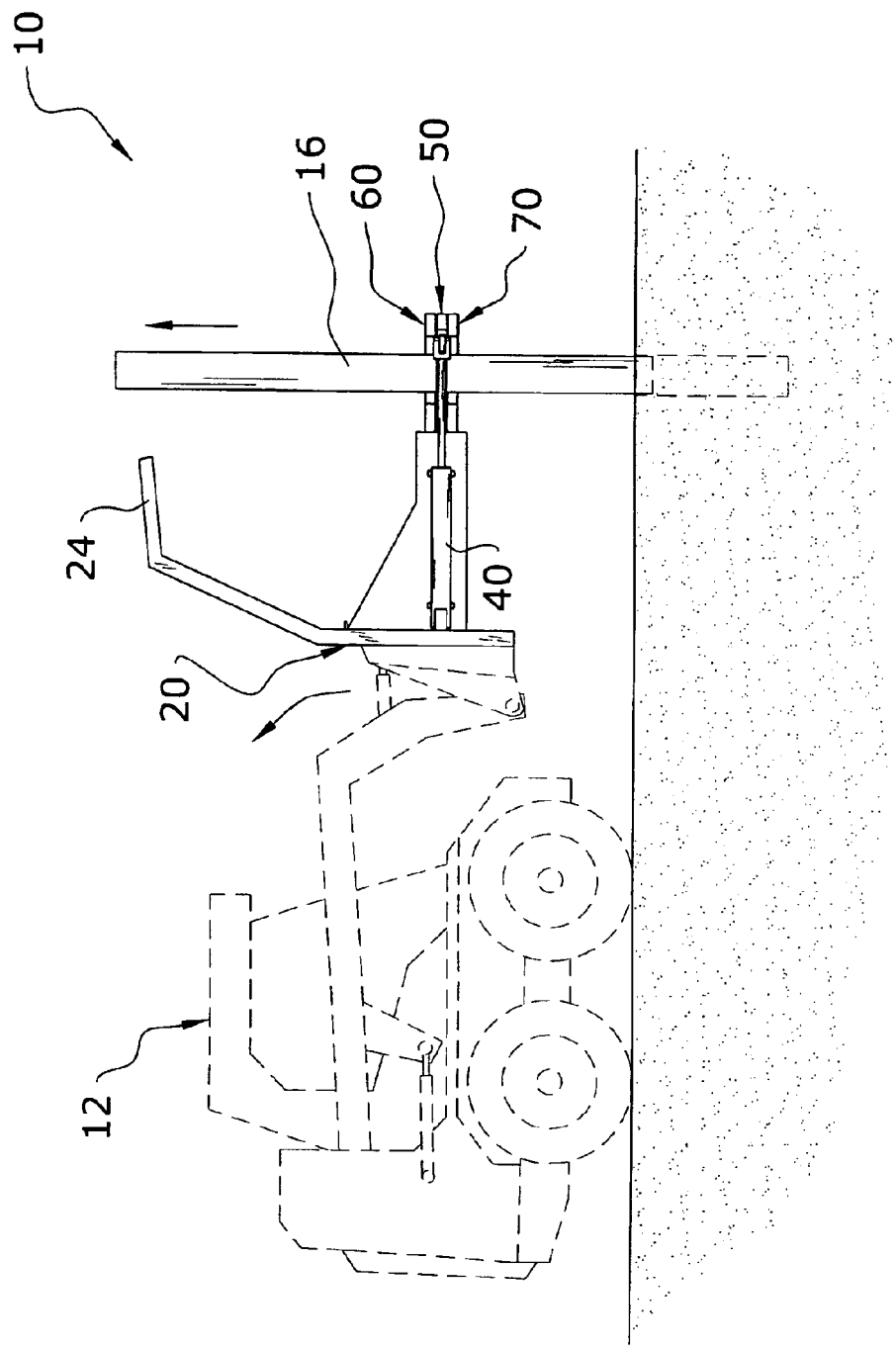
FIG. 6 is a side view of the present invention secured about a wooden post and lifting the wooden post from the ground surface.
Figure 7:
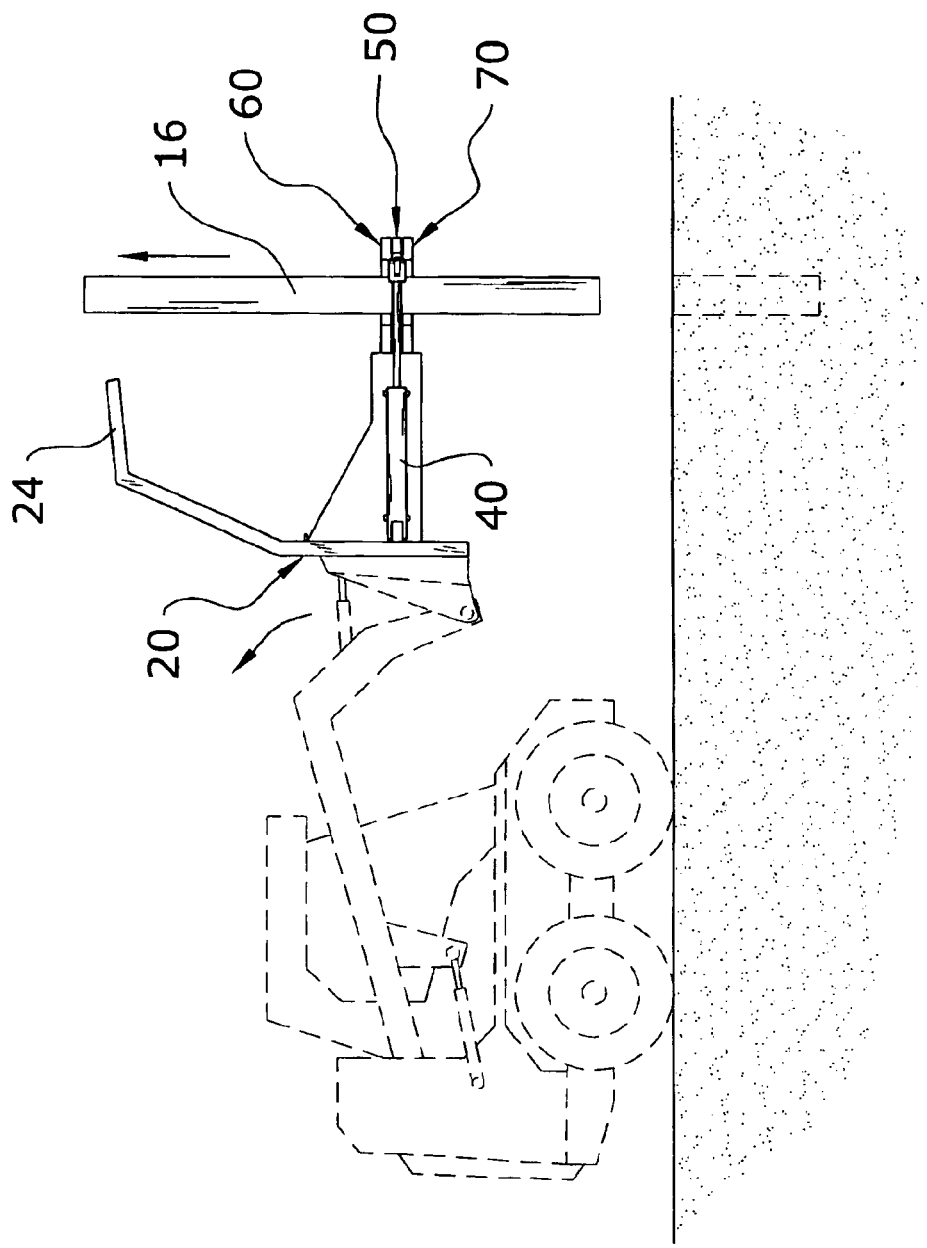
FIG. 7 is a side view of the present invention secured about a wooden post having lifted the wooden post completely from the ground surface.

FIGS. 1 and 2 best illustrate the frame 20. The frame 20 is attachable to a loader of a tractor 12 as shown in FIGS. 5 through 7 of the drawings. The frame 20 may be attached to the loader utilizing various conventional attachment structures which are well known in the art of loaders. The frame 20 may have various structures other than illustrated in the drawings as can be appreciated.

The frame 20 may include a first support 22 and a second support 24 extending outwardly from an upper portion of the frame 20 for supporting an upper portion of a post during and after removal as illustrated in FIGS. 1, 2, 5, 6 and 7 of the drawings. The first support 22 and the second support 24 may form a V-shaped or U-shaped receiving structure as shown in FIGS. 1 and 2 of the drawings. When the post 14, 16 is removed from the ground surface, the upper portion of the post 14, 16 may rest against the frame 20.

C. Extended Structure

FIGS. 1 through 4b of the drawings illustrate an extended structure 30 extending from the frame 20. The extended structure 30 extends outwardly a finite distance to support the jaws 50, 60, 70 as shown in FIGS. 1 through 4b of the drawings. It can be appreciated that the jaws 50, 60, 70 may be directly connected to the frame 20 without the extended structure 30.

D. Jaws

FIGS. 1 through 5 of the drawings illustrate a first jaw 50 pivotally attached to the extended structure 30 or to the frame 20. The inner end of the first jaw 50 is pivotally attached to the extended structure 30 or the frame 20 for allowing pivotal movement along a substantially horizontal plane. It can be appreciated that the first jaw 50 may be non-movably attached to the extended structure 30 or the frame 20 instead of the second jaw 60 and the third jaw 70.

The second jaw 60 and the third jaw 70 are attached to the extended portion or the frame 20 in opposition to the first jaw 50 for catchably receiving a post between thereof as illustrated in FIGS. 1 and 2 of the drawings. The second jaw 60 and the third jaw 70 define a slot between thereof that is capable of receiving the first jaw 50 as further shown in FIGS. 1 and 2 of the drawings.

The second jaw 60 and the third jaw 70 may be non-movably or pivotally attached to the extended portion or the frame 20. If the second jaw 60 and the third jaw 70 are non-movably attached, a support member 62 may be attached between the extended portion (or the frame 20) and the first jaw 50 and the second jaw 60 as illustrated in FIGS. 3a through 4b of the drawings.

As best illustrated in FIGS. 3a through 4b of the drawings, the first jaw 50, the second jaw 60 and the third jaw 70 each have an inwardly curved structure. The first jaw 50, the second jaw 60 and the third jaw 70 also each have a central straight portion as best illustrated in FIG. 3b of the drawings.

E. Actuator Unit

The actuator unit 40 is attached between the frame 20 and the first jaw 50 as shown in FIGS. 1 through 7 of the drawings. The actuator unit 40 is attached to the first arm a distance away from a pivot point as best illustrated in FIGS. 4a and 4b of the drawings. The actuator unit 40 may be comprised of a hydraulic cylinder or other actuator structure. A control unit or other control system is in communication with the actuator unit 40 for controlling the operation of the actuator unit 40.

F. Operation of Invention

In use, the user first attached the present invention to the loader of a tractor 12 as illustrated in FIGS. 5 through 7 of the drawings. The user then opens the first jaw 50 with respect to the second jaw 60 and the third jaw 70 as shown in FIGS. 3a and 4a of the drawings.

Figure 3A:
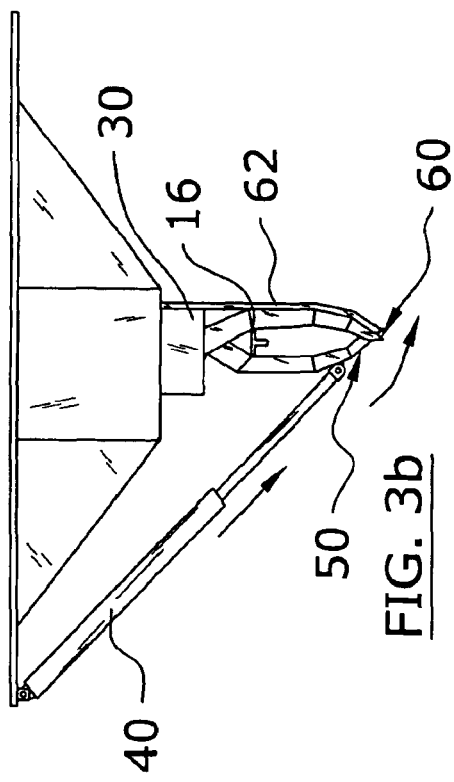
FIG. 3a is a top view with the jaws open and positioned about a metal post.
Figure 3B:
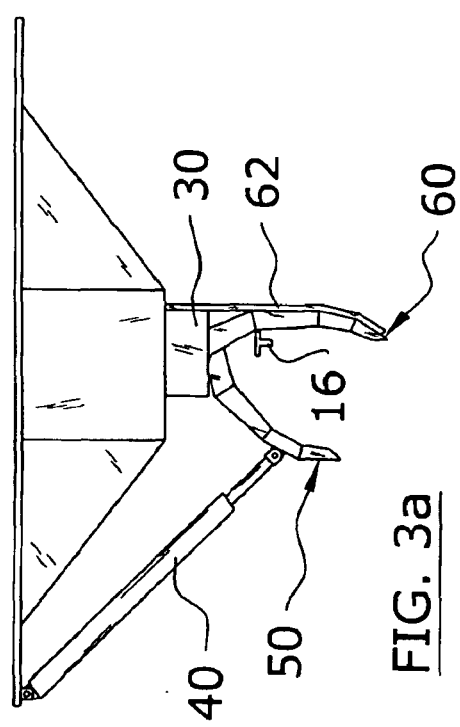
FIG. 3b is a top view with the jaws partially closed and positioned about the metal post.
Figure 3C:
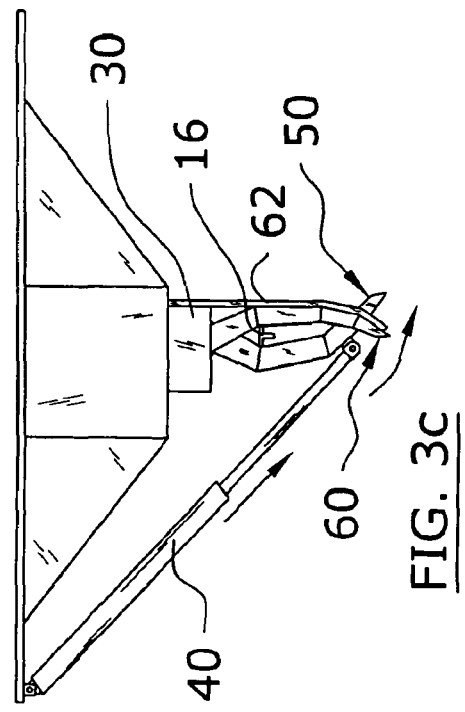
FIG. 3c is a top view with the jaws closed about the metal post.
Figure 4A:
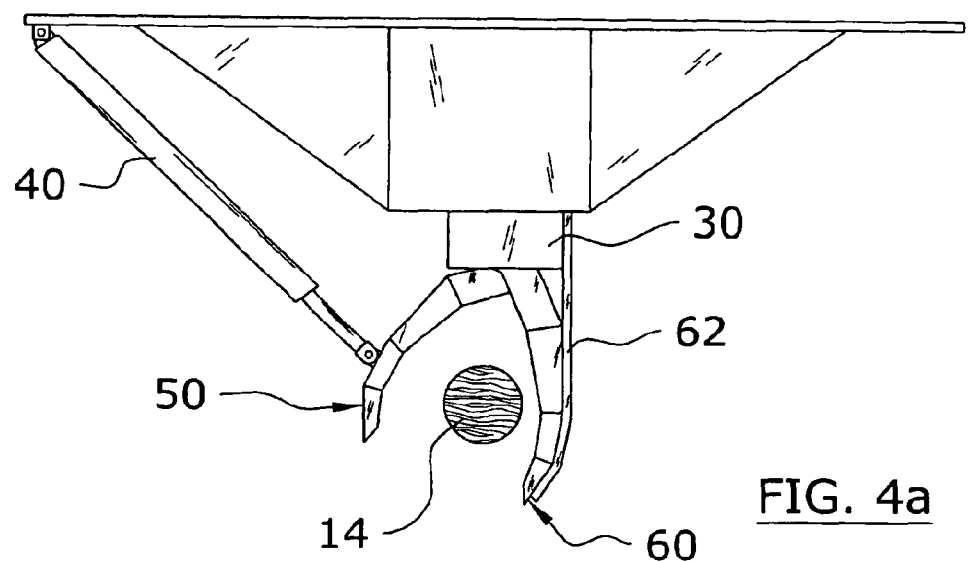
FIG. 4a is a top view with the jaws open and positioned about a wooden post.
Figure 4B:
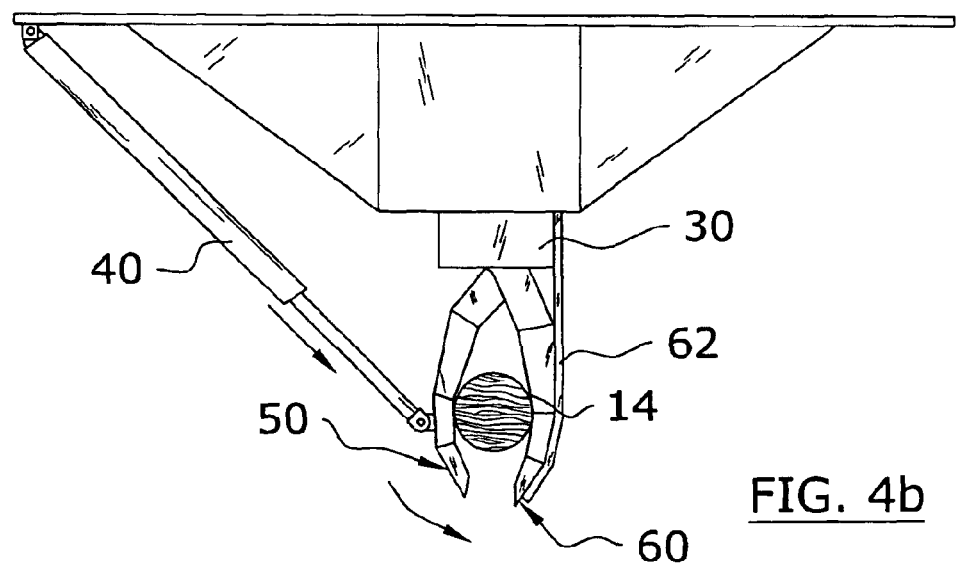
FIG. 4b is a top view with the jaws closed about a wooden post.

Whether removing a metal post 14 or a wooden post 16, the user positions the post 14, 16 between the jaws 50, 60, 70 as shown in FIGS. 3a and 4a of the drawings. The user then manipulates the actuator unit 40 so as to extend thereby closing the first jaw 50 with respect to the second jaw 60 and the third jaw 70 as shown in FIGS. 3b and 4b of the drawings. The first jaw 50 is closed until the post 14, 16 is catchably engaged between the jaws 50, 60, 70 as shown in FIGS. 3c and 4b of the drawings.

The user then lifts the present invention with the post 14, 16 catchably received within the jaws 50, 60, 70 by elevating the loader of the tractor 12 as shown in FIG. 6 of the drawings. The user continues elevating the post 14, 16 until the post 14, 16 is completely removed from the ground as shown in FIG. 7 of the drawings. The user may then transport the post 14, 16 to a desired location and release the jaws 50, 60, 70 from the post 14, 16 thereby releasing the post 14, 16 from the jaws 50, 60, 70. The user may then repeat the above process for additional posts 14, 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are 11 deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A post puller system, comprising:

a frame attachable to a loader of a tractor;

an extended structure extending from said frame;

a first jaw pivotally attached to said extended structure;

an actuator unit attached between said frame and said first jaw; and a second jaw and a third jaw attached to said extended portion in opposition to said first jaw for catchably receiving a post between thereof, wherein said second jaw and said third jaw are non-movably attached to said extended portion.

2. The post puller system of claim 1, wherein said second jaw and said third jaw define a slot between thereof that is capable of receiving said first jaw.

3. The post puller system of claim 1, wherein said first jaw, said second jaw and said third jaw each have an inwardly curved structure.

4. The post puller system of claim 1, wherein said actuator unit is attached to said first arm a distance away from a pivot point.

5. The post puller system of claim 1, wherein said first jaw, said second jaw and said third jaw each have a central straight portion.

6. The post puller system of claim 1, wherein said frame includes a first support and a second support extending outwardly for supporting an upper portion of a post during and after removal.

7. The post puller system of claim 6, wherein said first support and said second support form a V-shaped receiving structure.

8. The post puller system of claim 1, including a support member attached to said extended portion and said first jaw and said second jaw.

9. The post puller system of claim 8, wherein said actuator unit is comprised of a hydraulic cylinder.

10. A post puller system, comprising:
 a frame attachable to a loader of a tractor;
 a first jaw pivotally attached to said frame;
 an actuator unit attached between said frame and said first jaw; and
 a second jaw and a third jaw attached to said frame in opposition to said first jaw for catchably receiving a post between thereof, wherein said second jaw and said third jaw define a slot between thereof that is capable of receiving said first jaw.

11. The post puller system of claim 10, wherein said first jaw, said second jaw and said third jaw each have an inwardly curved structure.

12. The post puller system of claim 10, wherein said second jaw and said third jaw are non-movably attached to said frame.

13. The post puller system of claim 10, wherein said actuator unit is attached to said first arm a distance away from a pivot point.

14. The post puller system of claim 10, wherein said first jaw, said second jaw and said third jaw each have a central straight portion.

15. The post puller system of claim 10, wherein said frame includes a first support and a second support extending outwardly for supporting an upper portion of a post during and after removal.

16. The post puller system of claim 15, wherein said first support and said second support form a V-shaped receiving structure.

17. The post puller system of claim 10, including a support member attached to said extended portion and said first jaw and said second jaw.

18. The post puller system of claim 17, wherein said actuator unit is comprised of a hydraulic cylinder.

19. A post puller system, comprising:
 a frame attachable to a loader of a tractor;
 a first jaw pivotally attached to said frame;
 an actuator unit attached between said frame and said first jaw; and
 a second jaw and a third jaw attached to said frame in opposition to said first jaw for catchably receiving a post between thereof, wherein said second jaw and said third jaw are non-movably attached to said frame.

20. The post puller system of claim 19, wherein said second jaw and said third jaw define a slot between thereof that is capable of receiving said first jaw.

\* \* \* \* \*